United States Patent
Carini

[15] 3,697,765
[45] Oct. 10, 1972

[54] FLUID DRIVEN ELECTRICAL POWER APPARATUS

[72] Inventor: Eugene P. Carini, 800 28th Avenue, Vero Beach, Fla. 32960

[22] Filed: Dec. 7, 1970

[21] Appl. No.: 95,462

[52] U.S. Cl. ..........................290/54, 290/55, 290/44
[51] Int. Cl. ...............................................F03d 9/00
[58] Field of Search............290/1, 43, 44, 54, 55, 15, 290/23, 29, 39, 49

[56] References Cited

UNITED STATES PATENTS

| | | |
|---|---|---|
| 2,177,801 | 10/1939 | Erren............................290/55 |
| 3,339,078 | 8/1967 | Crompton....................290/44 |
| 822,317 | 6/1906 | Stumpf.........................290/39 |
| 875,484 | 12/1907 | Anderson.................290/39 X |
| 2,153,523 | 4/1939 | Roberts et al. ..............290/55 |
| 1,894,357 | 1/1933 | Manikowske et al........290/44 |
| 2,237,857 | 4/1941 | Winderl.......................290/44 |

*Primary Examiner*—G. R. Simmons
*Attorney*—Fishman and Van Kirk

[57] ABSTRACT

A fluid driven electrical power producing apparatus in which a field assembly is rotated in one direction by first fluid drive device and the armature assembly is driven in the opposite direction by a second fluid drive device.

2 Claims, 2 Drawing Figures

PATENTED OCT 10 1972

3,697,765

INVENTOR
EUGENE P. CARINI

BY Fishman and VanKirk
ATTORNEYS

FLUID DRIVEN ELECTRICAL POWER APPARATUS

BACKGROUND OF THE INVENTION

1. Field of the Invention

This invention relates to electrical power generating apparatus and is more particularly concerned with a power generating apparatus which utilizes fluid drive means to produce counter-rotating field and armature assemblies.

2. Description of the Prior Art

Electrical power producing apparatus known in the prior art generates electrical power by driving a rotor assembly within or about a stationary stator assembly.

In the smaller generating systems such as those employed in automotive vehicles, the principal power input to the rotor assembly is derived from a mechanical power source such as an internal combustion engine. Only in larger electrical power generating systems such as found in the power plants of utility companies, is the power for driving the rotor assembly derived from a motive fluid. In practically all power generating stations, high pressure steam derived from a fossil fueled or nuclear reactor boiler is delivered to a turbine and mechanical power from the turbine is used to drive the rotor assembly of a large generator. In certain localities, the motive fluid power is derived by damming a river or stream and utilizing the hydrostatic water pressure to produce a high velocity fluid stream for driving a dynamo.

In most of the prior art devices where a motive fluid is utilized to generate electrical power, the fluid drives some type of impeller wheel which is connected either directly of indirectly to the rotor assembly of a generator or alternator. However, since it is relative motion between the stator assembly and rotor assembly which creates the electrical power, it is possible to rotate both the field and armature assemblies in opposite directions to generate electrical power. A fluid drive means can be conveniently employed to produce counter-rotation of both the field and armature assemblies.

SUMMARY OF THE INVENTION

The fluid driven electrical power apparatus according to the present invention is formed by armature and field assemblies, both of which are rotatably mounted to a frame structure, and fluid drive means composed of impeller wheels and fluid conduits for driving the armature and field assemblies in counter-rotation. A first assembly is mounted by journal bearings to the frame and contains field-producing members. The second assembly is mounted adjacent to the stator assembly and includes an armature that rotates in the field generated by the first or field producing assembly. A fluid impeller wheel is connected to the housing of the stator assembly and is supplied with motive fluid from a conduit which discharges the fluid against the impeller to rotate the first assembly in one direction. Another impeller wheel is connected to the second assembly and has a corresponding conduit which delivers motive fluid to rotate the armature in the opposite direction. The counter-rotation of the assemblies results in the generation of electrical power.

BRIEF DESCRIPTION OF THE DRAWINGS

The novel fluid driven electrical power generating apparatus will be described and better understood by reference to the following drawings wherein the same elements bear the same reference numerals throughout the several figures.

DESCRIPTION OF THE PREFERRED EMBODIMENTS

Figure 1:
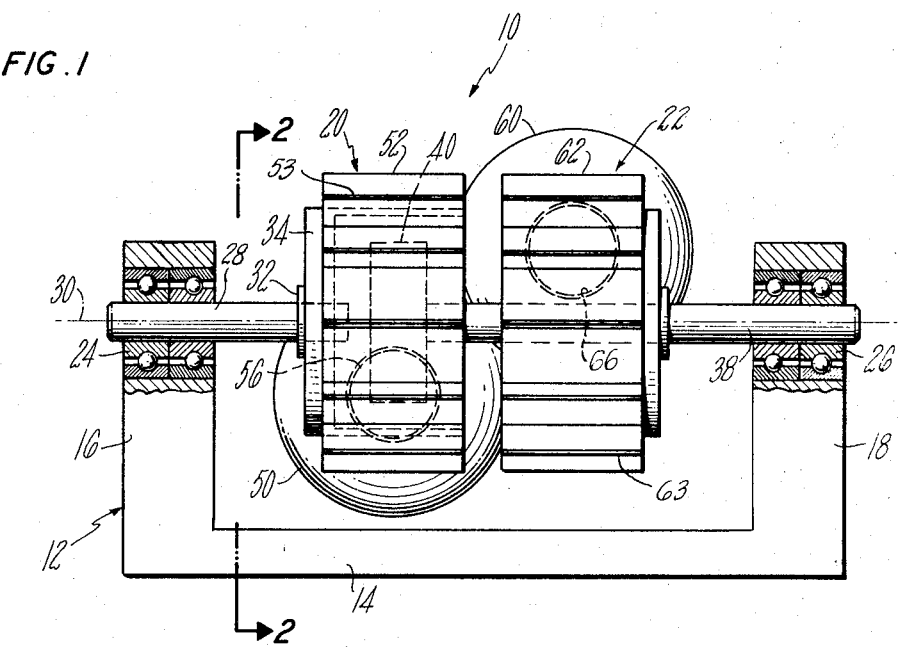
FIG. 1 is a side view of one embodiment of the fluid driven generating apparatus showing the two impeller wheels which turn the field and armature assemblies in opposite directions.

The novel fluid driven electrical power generating apparatus is shown in FIG. 1. The apparatus, generally designated by the numeral 10, has a frame 12 which composes the principal supporting structure for the remaining components. The frame 12 is composed of a base 14 and two uprights 16 and 18 at opposite ends of the base.

The principal components of the generating apparatus, which may be either a generator or an alternator, include the field assembly, generally designated 20, and the armature assembly, generally designated 22. The field assembly 20 and the armature assembly 22 are suspended between the upper ends of uprights 16 and 18 in journal bearings 24 and 26 respectively.

The field assembly 20 is supported in cantilever fashion on a shaft 28 which is mounted in bearing 24. As is known and standard in the art, bearing 24 may be a double ball bearing configuration to provide desired support for cantilever shaft 28. Shaft 28 extends along the axis 30 which is the rotational axis of both bearings 24 and 26. The shaft 28 is connected by any suitable means such as flange 32 to the housing 34 of the field assembly 20. The mounting of the field assembly 20 on the shaft 28 permits the entire assembly 20 to be rotated about axis 30 while frame 12 is held stationary.

The armature assembly 22 is composed of another shaft 38 and an armature 40 which is securely fastened to shaft 38. Shaft 38 extends along the axis 30 and is supported in cantilever fashion from frame 12 by bearing 26 so that armature 40 can also be rotated about axis 30. As is known and standard in the art, bearing 24 may be a double ball bearing configuration to provide desired support for cantilever shaft 38.

The field housing 34 has a hollow, cylindrical, central cavity which opens on the side opposite flange 32 to receive the armature 40 of the assembly 22. As seen in FIG. 1, armature 40 is positioned centrally within the cavity of stator housing 34 and in this position, armature 40 may rotate coaxially within housing 34.

Figure 2:
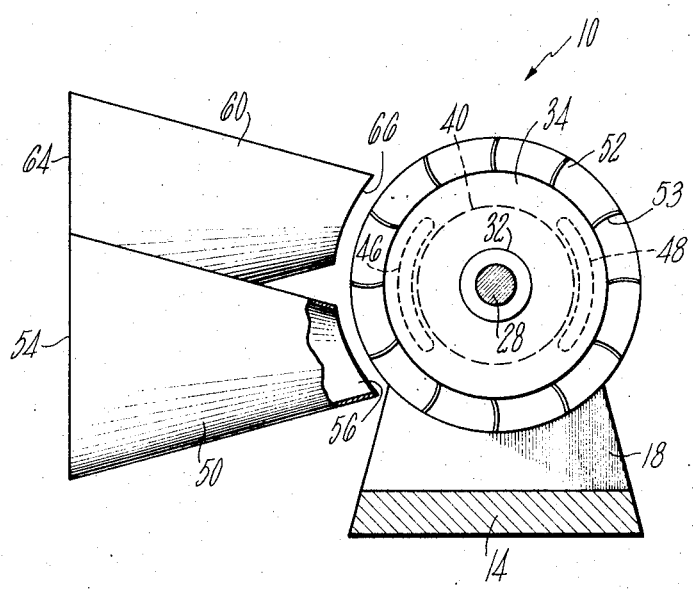
FIG. 2 is an end view of the fluid driven generating device as seen along the section 2—2 in FIG. 1.

FIG. 2 is a view of the fluid driven power generating device as seen from the left-hand side in FIG. 1 along the sectioning line 2—2. Within the housing 34 two field generating pole pieces 46 and 48 are oppositely disposed at the periphery of the central cavity. The pole pieces 46 and 48 may be permanent magnets which generate a magnetic field in the plane occupied by the rotor 40 within the housing 34. Alternately, the pole pieces 46 and 48 may be electromagnetic coils which can be suitably energized from an external battery connected to the pieces through commutators on shaft 28.

It will be understood that when the pole pieces 46 and 48 establish a magnetic field and armature 40 is rotated within that field, an electromagnetic force is generated in the windings of the armature and electrical power can be derived from the armature through commutators on shaft 38.

It is a principal feature of the present invention that the relative motion of armature 40 and the field generated by pole pieces 46 and 48 is produced by counter-rotation of assembly 20 and assembly 22. The assembly 20 may be driven in a counterclockwise direction as seen in FIG. 2 while the assembly 22 is simultaneously driven in a clockwise direction.

To this end, the assembly 20 is provided with a fluid drive means comprising a fluid conduit 50 and a fluid impeller wheel 52. Impeller wheel 52 is mounted coaxially on the external surface of housing 34. Conduit 50 in the embodiment disclosed converges from a circular inlet 54 at one end to a discharging aperture 56 disposed in close relationship to the periphery of impeller wheel 52. The wheel 52 may be a conventional impeller wheel including a plurality of cups, or vanes 53 circumscribing the periphery of housing 34 so that motive fluid discharging from conduit 50 strikes the wheel. The transfer of momentum from a motive fluid in a duct to an impeller wheel to cause rotation is a well-known concept and does not require further elaboration.

In a similar respect, the assembly 22 is operated by another fluid drive means comprising conduit 60 and impeller wheel 62 having a plurality of cups or vanes 63 (FIG. 1). Conduit 60 has a large, circular fluid inlet 64 at one end and a smaller fluid discharging aperture 66 at the other end located in close proximity to the periphery of impeller wheel 62. Again motive fluid discharging from conduit 60 onto wheel 62 causes rotation of wheel 62. Again motive fluid discharging from conduit 60 onto wheel 62 causes rotation of wheel 62. Wheel 62 is secured to shaft 38, and, accordingly, rotation of wheel 62 produces a corresponding rotation of armature 40.

It is readily apparent from the positioning of the conduits 50 and 60 in FIG. 2 that rotation of the two wheels 52 and 62 will be in opposite directions. The counter-rotation of the wheels 52 and 62 will be in opposite directions. The counter-rotation of the wheels 52 and 62 produces a corresponding counter-rotation of the field assembly 20 and armature assembly 22 to generate electrical power as described above.

With the two conduits 50 and 60 located on the same side of the apparatus 10 as indicated in FIG. 2, it is contemplated that the device might be employed on a vehicle moving through air with the inlets facing in the forward direction. It will be readily understood that moving the apparatus 10 through the air to the left as seen in FIG. 2 creates an air stream in the conduits and across the impeller wheels to generate the rotational motions.

The velocity of any given fluid stream determines the amount of power that can be generated by the apparatus. Air, oil or water can be employed as the fluid medium which drives the impeller wheels.

While the novel fluid driven electrical power apparatus has been described in one embodiment, it should be understood that various modifications and substitutions can be made without departing from the spirit of the invention. For example, additional conduits may be mounted about the impeller wheels to derive additional power. Conduits 50 and 60 may be mounted to frame 12 or may be supported from separate structure. It is important, however, that the positioning of the discharging ends 56 and 66 be correlated with the positioning of wheels 52 and 62 to obtain maximum momentum transfer from the motive fluid to the wheels. It is also noteworthy that the present invention, while not limited thereto in its utility, is particularly well suited for installation on moving vehicles. Accordingly, the fluid driven power generating apparatus has been described by way of illustration rather than limitation.

What is claimed is:

1. A fluid driven electrical power generating apparatus comprising:
   frame means;
   magnetic field producing means mounted from said frame means for rotation about an axis, said field producing means having a central cylindrical cavity coaxial with its axis of rotation;
   armature means mounted from said frame means for rotation about said axis, said armature means including an armature winding disposed within said field producing means cylindrical cavity whereby the field producing means and armature winding may rotate with respect to one another for electrical power generation;
   a first impeller wheel affixed to and mounted coaxially about at least a portion of said field producing means and in driving relationship therewith;
   first fluid conduit means for delivering motive fluid to said first impeller wheel for rotating said wheel means in a first direction, and first fluid conduit means being disposed generally transverse to said axis and having a fluid discharging end confronting the periphery of said first impeller wheel for transferring momentum of motive fluid discharging from said first conduit means to said first impeller wheel;
   a second impeller wheel coaxial with said axis and spacially displaced from said first impeller wheel, said second impeller wheel being connected in mechanical driving relationship to said armature means; and
   second fluid conduit means for delivering motive fluid to said second impeller wheel for rotating said armature means in a second direction opposite to said first direction, said second fluid conduit means being disposed generally transverse to said axis and having a fluid discharging end disposed adjacent the periphery of said second impeller wheel.

2. The fluid driven electrical power generating apparatus of claim 1 wherein said armature means comprises:
   a drive shaft extending along said axis and journaled in said frame means, said armature winding being mounted on said drive shaft for rotation therewith.

* * * * *